United States Patent [19]

Umezawa

[11] Patent Number: 5,142,573
[45] Date of Patent: Aug. 25, 1992

[54] TELEPHONE APPARATUS FOR RADIO COMMUNICATION WITH AN ADAPTOR

[75] Inventor: Masaaki Umezawa, Tokyo, Japan

[73] Assignee: OKI Electric Industry Co., Ltd., Tokyo, Japan

[21] Appl. No.: 650,204

[22] Filed: Feb. 4, 1991

[30] Foreign Application Priority Data

Feb. 8, 1990 [JP] Japan .............................. 2-011056[U]

[51] Int. Cl.5 ..................... H04M 1/00; H04M 11/00; H04B 1/38
[52] U.S. Cl. .................................. 379/454; 379/441; 379/58; 455/89; 455/90
[58] Field of Search ...................... 379/58, 61, 62, 370, 379/433, 428, 438, 440, 441, 454; 455/89, 90

[56] References Cited

U.S. PATENT DOCUMENTS

| | | | |
|---|---|---|---|
| 4,488,009 | 12/1984 | Sherman | 379/370 |
| 4,868,862 | 9/1989 | Ryoichi et al. | 379/58 |
| 4,903,325 | 2/1990 | Yoshitake et al. | 455/89 |
| 4,955,071 | 9/1990 | Wong et al. | 455/90 |

FOREIGN PATENT DOCUMENTS 0344988 12/1989 European Pat. Off. ............ 379/440

OTHER PUBLICATIONS

Mitsubishi Electric, "Car Mount Adaptor Scheme", Nov. 8, 1988.

*Primary Examiner*—James L. Dwyer
*Assistant Examiner*—William Cumming
*Attorney, Agent, or Firm*—Spencer, Frank & Schneider

[57] ABSTRACT

A telephone apparatus includes a telephone set consisting of a base unit and a handset removably mounted on the base unit. The apparatus also includes a transmitter/receiver, and an adaptor on which the base unit is mounted. The adaptor has an electrical connector which is electrically connected to the transmitter/receiver. The adaptor includes a main body which supports the electrical connector, and a slide member which includes a cover housing. The slide member, including the housing, is mounted on the main body for sliding movement between a first position, in which the connector is exposed for connection to the telephone set, and a second position in which the housing covers the electrical connector to protect it from dust and inadvertent impact. The main body and the slide member jointly support the telephone set with the connector connected to the telephone set, when the slide member is in the first position.

12 Claims, 4 Drawing Sheets

TELEPHONE APPARATUS FOR RADIO COMMUNICATION WITH AN ADAPTOR

BACKGROUND OF THE INVENTION

This invention relates to a telephone apparatus for radio communications such as a mobile telephone, and more particularly, to such a telephone apparatus which is provided with an adaptor having a male connector that connects a transmitter/receiver to a base unit of the telephone apparatus.

A mobile radio telephone has a base unit, a handset, an adaptor and a transmitter/receiver. The headset is mounted on the base unit which has a female connector. The adaptor has a body and a male connector which is electrically connected to the transmitter/receiver by a cable. The base unit is electrically connected to the transmitter/receiver and is mounted on the adaptor by the connectors. The base unit with the handset can be detached from the adaptor by a user.

When the base unit is detached from the adaptor, the male connector of the adaptor is exposed. The exposed adaptor can be contaminated by dust in the air or broken by inadvertent impacts.

SUMMARY OF THE INVENTION

It is an object of the present invention to provide a telephone apparatus for radio communications having an adaptor wherein a connector of the adaptor is protected from contamination by airborne particle when a base unit is removed from the adaptor. It is another object of the present invention to provide a telephone apparatus for radio communications having an adaptor wherein the connector of the adaptor is protected from breakage due to inadvertent impacts when the base unit is removed from the adaptor.

A telephone apparatus for radio communication according to the invention comprises a telephone set consisting of a base unit and a handset removably mounted on the base unit. The apparatus also includes a transmitter/receiver, and an adaptor on which the base unit is mounted. The adaptor has an electrical connector which is electrically connected to the transmitter/receiver. The adaptor includes a main body which supports the electrical connector, and a slide memeber which includes a cover housing. The slide member, including the housing, is mounted on the main body for sliding movement between a first position, in which the connector is exposed for connection to the telephone set, and a second position in which the housing covers the electrical connector to protect it from dust and inadvertent impact. The main body and the slide member jointly support the telephone set with the connector connected to the telephone set when the slide member is in the first position.

BRIEF DESCRIPTION OF THE DRAWINGS

These and other features and advantages of the invention will be further understood from the following detailed description of the preferred embodiment with reference to the accompanying drawings in which.

DETAILED DESCRIPTION OF THE PREFERRED EMBODIMENT

Now, the present invention will be described in a greater detail hereunder with reference to the accompanying drawings which illustrate preferred embodiments thereof.

Figure 1:
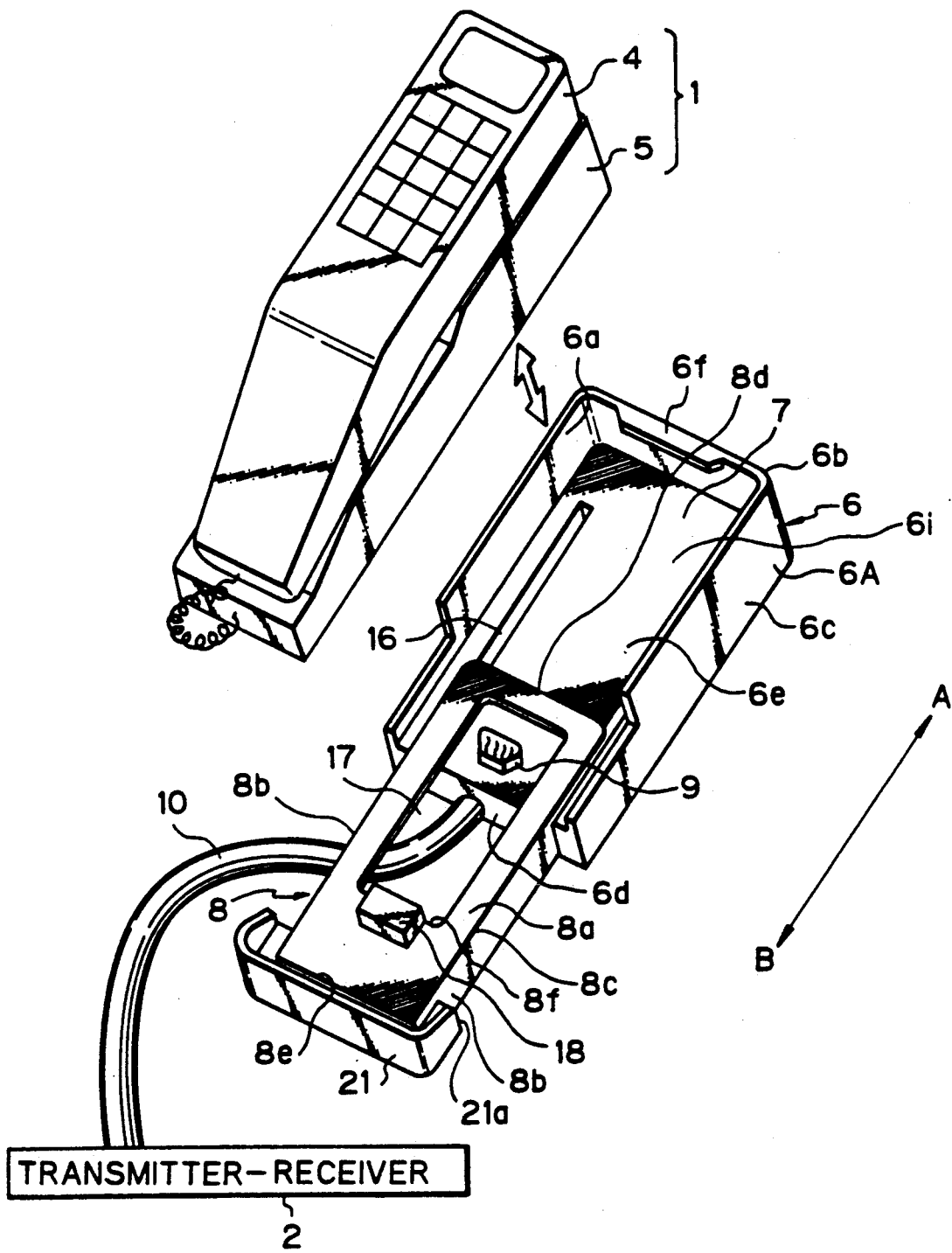
FIG. 1 is an perspective view showing a radio communication telephone apparatus according to a first embodiment of the invention which includes a headset, a base unit and an adaptor, the base unit and the handset being detached from the adaptor.
Figure 3:
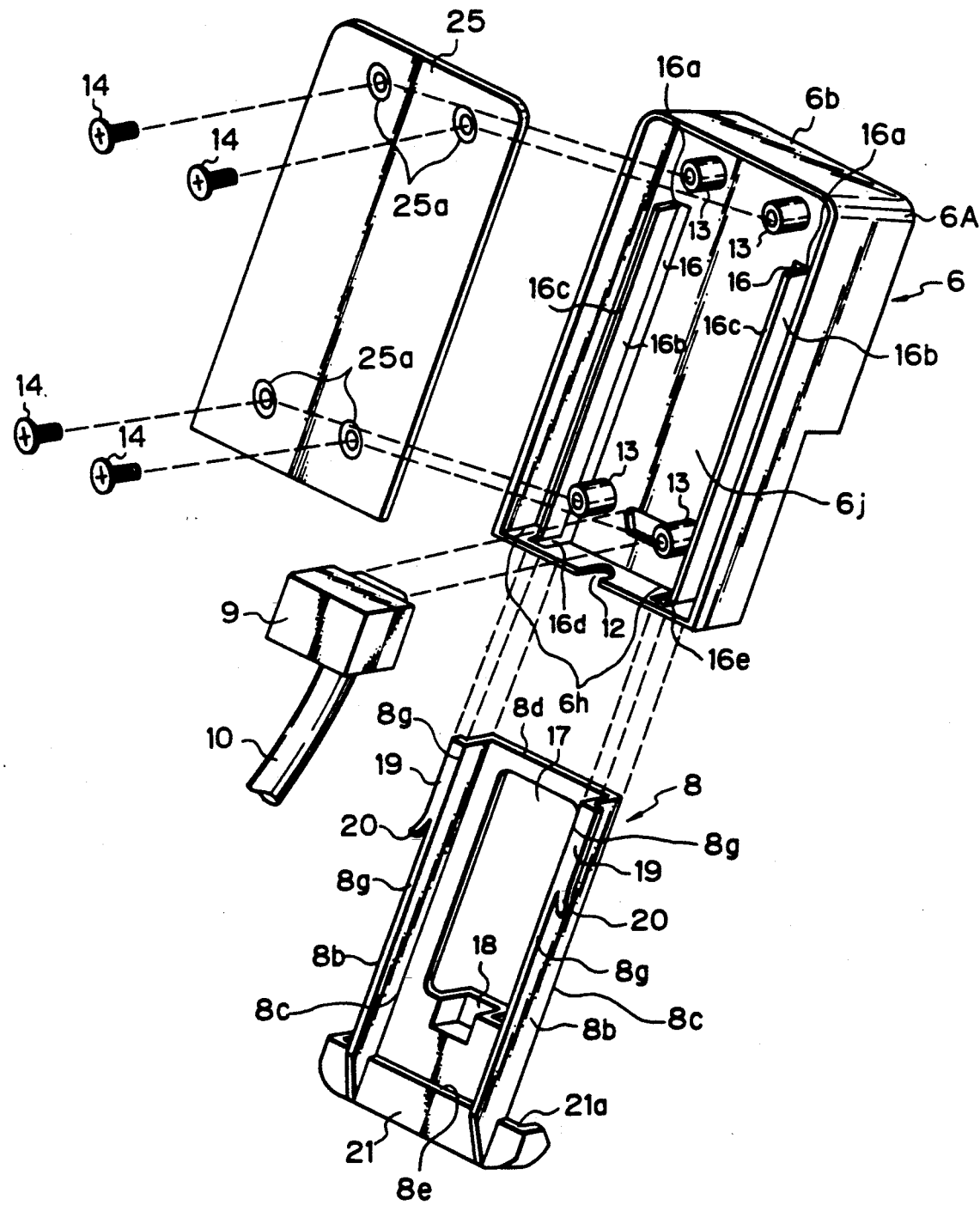
FIG. 3 is an exploded view of the back side of the adaptor of FIG. 1.

First, referring to FIG. 1, a telephone apparatus according to a first embodiment of the present invention includes a telephone set 1, a transmitter/receiver 2 and an adaptor 7. The telephone set 1 includes a handset 4 and a base unit 5. The handset 4 can be mounted on and detached from the base unit 5. The adaptor 7 removably supports the telephone set 1 and electrically connects the base unit 5 to the transmitter/receiver 2 via a cable 10. The adaptor 7, which can be molded of a hard plastic, includes a base or main body 6, a male electrical connector 9, and a slide member 8. The connector 9 is connected to the cable 10 and projects from a top or main surface 6i of the main body 6. The main body 6 includes sidewalls 6a, 6b, 6c and 6d forming a frame 6A, a flat rectangular plate-shaped member or portion 6e surrounded by the frame 6A, and a short wide projection 6f extending inward over the plate-shaped portion 6e from a top edge of the sidewall 6b. The adaptor 7 is symmetrically shaped with respect to a longitudinal center plane which bisects the adaptor perpendicularly to a plane of the plate-shaped portion 6e. The frame 6A projects both upward and downward relative to the plane of the plate-shaped portion 6e except for the sidewall 6d thereof. The sidewall 6d extends only downward relative to the plate-shaped portion 6e. A pair of narrow parallel guide slots is formed in the plate-shaped portion 6e. As shown in FIG. 3, the slots 16 are parallel to the sidewalls 6a and 6c and pass through the sidewall 6d. Portions 16d of the slots 16, which are formed in the sidewall 6d, have at their top ends outwardly projecting slots portions 16e.

The slide member 8 has a flat, rectangular plate-shaped portion 8a, opposing parallel runners 8b depending downward from opposing side edges 8c, a front edge 8d and a rear edge 8e. An approximately rectangular opening 17 is formed in the plate-shaped portion 8a positioned midway between the side edges 8c. A box-shaped cover housing 18, which is open on a bottom side and a front side thereof, projects from a top surface 8j of the plate-shaped portion 8a. The cover housing 18 is positioned at a side 8f of the opening 17 so as to open to the opening 17 adjacent to the rear edge 8e. A frame 21 having a stopper portion 21a on a forward surface thereof is formed along the rear edge 8e.

The slide member 8 is slideably mounted on the main body 6 with the runners 8b in the guide slots 16 (see also FIG. 3). The male connector 9 projects through the opening 17 from the main or top surface 6i of the main body 6 so that with the telephone set 1 detached from the adaptor 7, the slide member 8 can be freely slid a distance inward (direction A in FIG. 2) and outward (direction B in FIG. 2) of the main body 6 between the outward position shown in FIG. 1 and the inward position shown in FIG. 2. In the position shown in FIG. 1, the sidewalls 6a, 6b and 6c and the frame 21 guide the telephone set 1 onto the adator 7 with the male connector 9 receied in and detachably attached to a female electrical connector 3 in the base unit 5. When the slide member 8 is slid inwardly (direction A) to the position shown in FIG. 2 (at which the stopper portion 21a abuts the side wall 6d), the cover housing 18 (see also FIG. 3) will at that position cover the male connector 9, thereby to shield the male conductor 9 from dust and protect it from impact damage.

Referring particularly to FIG. 3, which shows the back side of the adaptor, the plate-shaped portion 6e of the main body 6 has opening 11 in which the male connector 9, which connects to the cable 10, is fixed the back side. The cable 10 is pulled out through a recess 12 formed in the sidewall 6d. Formed on the back side 6j of the plate-shaped portion 6e along outer edge 16a of the guide slots 16 is a pair of slender guide-walls 16b having straight free bottom edges 16c. Four internally threaded posts 13 are also formed on the back side 6j of the plate-shaped portion 6e. A back plate 25 is fixed to the posts 13 with four screws 14 which pass through holes 25a in the back plate 25 to close the back of the main body 6.

Guide elements or portions 19 of the runners 8b extend outwardly from respective front portions of the bottom edges 8g so as to slideably bear on the bottom edges 16c of the guide-walls 16b. Forward portions of the guide elements 19 are separated and bent outwardly from the runners 8b so as to form projections 20 which are elastically bendable toward the guide-walls. The guide elements 19 are aligned with the slot portions 16e so that when the slide member 8 in initially inserted into the main body 6, the runners 8b pass through the slot portions 16d, the guide elements 19 pass through the slot portions 16e, and the projection bend elastically toward runners 8b so as to also pass through the slot portions 16e. Once the front portion of the slide member 8, including the projections 20, is within the main body 6, the projections 20 spring back to their original conditions and serve to block the slide member 8 from being entirely withdrawn from the main body 6 by engaging the inside surface of 6h of the sidewall 6d adjacent to the slot portions 16e (at the position shown in FIG. 1).

The telephone apparatus of the invention functions as follows: The slide member 8 of the adaptor 7 is slid in the direction B to the position shown in FIG. 1. In that position, the projections 20 contact the inside surface 6h of the sidewall 6d. A recess portion of the telephone set 1 (not shown) is hooked on the projection 6f. Then, the telephone set 1 is inserted in the space within the adaptor 7 defined by the frames 6A and 21. Simultaneously, the male connector 9 of the adaptor 7 engages the female connector 3 of the base unit 5. Thusly, the transmitter/receiver 2 and the telephone set 1 are connected via the cable 10 so that the telephone set can eb used.

Figure 2:
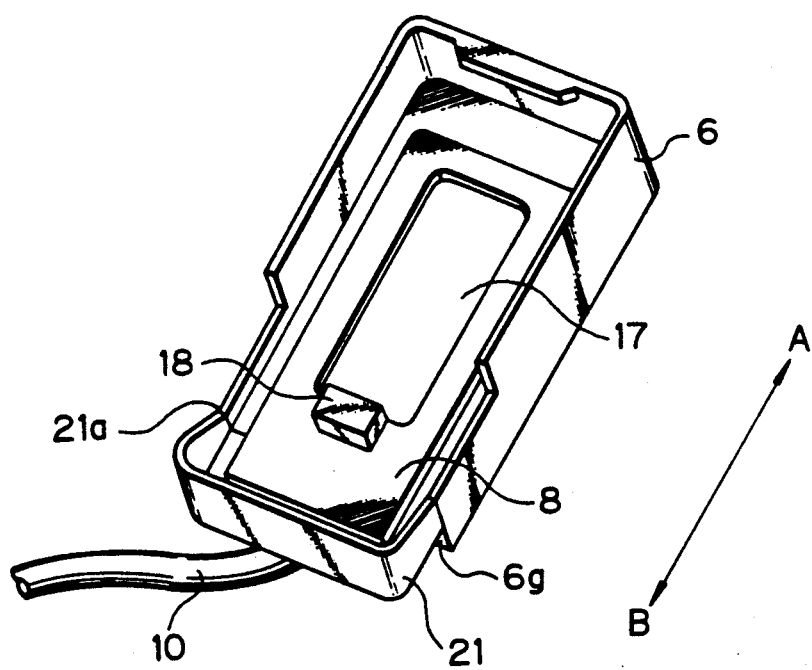
FIG. 2 is a perspective view showing a top side of the adaptor of FIG. 1, particularly illustrating how a male connector of the adaptor is covered with a slide member of the adaptor.

If the telephone set 1 is detached from the adaptor 7, the base unit 5 is lifted up from the adaptor 7 using the projection 6f as a fulcrum. Then, in order to protect the male connector from damage due to impacts or contaminants such as dust, the slide member 8 is slid in direction A until the stopper portion 21a of the frame contacts the sidewall 6d, whereby the male connector 9 is covered by the cover housing 18 as shown in FIG. 2.

Figure 4:
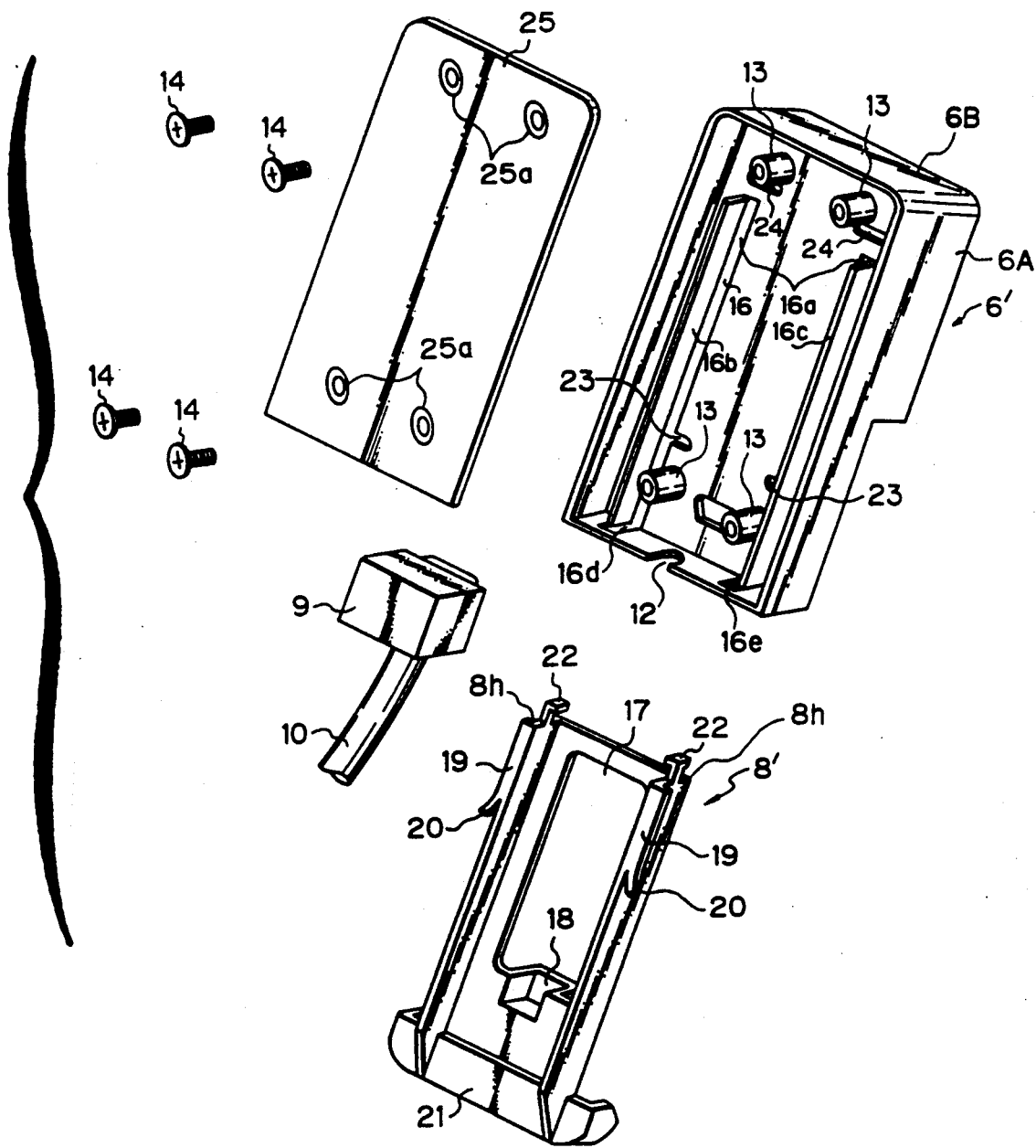
FIG. 4 is an exploded view of the back side of an adaptor according to a second embodiment of the invention.

The adaptor of the telephone apparatus, according to the second embodiment of the invention, will be described with reference to FIG. 4 which shows an exploded perspective view of the adaptor. Except as noted below the elements of second embodiment are substantially identical to those of the first embodiment. Reference numerals in FIG. 4 which are the same as those in FIGS. 1-3 designate the substantially identical elements. In the second embodiment, a pair of elastic hooks 22 are formed on the respective front edges 8h of the runners 8b. The hooks curve toward each other and upwardly so as to contact and be bent elastically downward by the plate-shaped portion 6e. A pair of recesses 23 is formed in the plate-shaped portion 6e and project toward each other from the guide grooves 16 at locations which correspond to those of the hooks 22 when the slide member 6 is in the outward position shown in FIG. 1. Thus, when the slide member 6 has been slid in the direction B until the projections 20 are in contact with the inside surface 6h of the sidewall 6d (the position shown in FIG. 1), the hooks releasably catch the recesses 23. A pair of openings 24 is similarly formed in the plate-shaped portion 6e at locations which correspond to those of the hooks 22 when the slide member 6 is in the inward position shown in FIG. 2. Thus, when the slide member 6 has been slid in the direction A until the stopper portion 21a contacts the outside surface of the sidewall 6d (the position shown in FIG. 1), the hooks releasably catch in the recesses 24. Thereby, the slide member 6 can be releasably locked in either of its two operational positions for respectively holding the telephone set 1 or protecting the male connector 9.

It will be understood that the above description of the present invention is susceptible to various modifications, changes and adaptations, and the same are intended to be comprehended within the meaning and range of equivalents of the appended claims.

What is claimed is:

1. An adaptor for supporting a telephone set and for use in connecting the telephone set to a transmitter/receiver, comprising:

a body having means for supporting a connector which is electrically coupled to the transmitter/receiver; and a slide member including a housing, said slide member being mounted on said body for sliding movement between a first position in which, with the telephone set mounted on said adaptor, said body and said slide member jointly support the telephone set and the connector is electrically connected to the telephone set, and a second position in which, with the telephone set removed from said adaptor, said housing covers the connector.

2. An adaptor according to claim 1, wherein said slide member has an opening therein shaped to expose the connector therethrough for connection to the telephone set when said slide member is in said first position, said housing receiving the connector therein when said slide member moves to said second position.

3. An adaptor according to claim 2, wherein said body includes a first plate-shaped member having a guide slot means, said slide member including a second plate-shaped member and a pair of runners projecting from said second plate-shaped member and slideably received in said guide slot means, said opening and said housing being formed in said second plate-shaped member.

4. An adaptor according to claim 3, wherein said first plate-shaped member has a first surface and a second surface opposite said first surface, said slot means comprising a pair of parallel slots and a guide-wall associated with each slot, each guide-wall extending along an edge of the associated slot, projecting from said second surface and terminating in a bottom edge, said second plate-shaped member being disposed on said first surface, said runners projecting though said slots and including guide portions which bear against the bottom edges of the guide-walls.

5. An adaptor according to claim 1, wherein said slide member has an opening and said body has a main surface, the connector projecting from the main surface into said opening when said slide member is in said first position, said housing receiving the connector when said slide member moves to said second position.

6. An adaptor according to claim 5, wherein said body includes a first plate-shaped member, said first plate-shaped member having said main surface and a pair of parallel guide slots, said slide member including a second plate-shaped member having a first side facing said plate-shaped member, a second side facing away from said first plate-shaped member and a pair of runners on said first side projecting though said slots, said opening being formed in said second plate-shaped member, said housing projecting from said second side in a direction away from said first plate-shaped member.

7. An adaptor according to claim 1, wherein said slide member is slideable in a given direction to move from said first position to said second position, further comprising a first frame means and second frame means respectively bounding said body and said slide member and, when said slide member is in said first position, together bounding a space defined on said body and said slide member for receiving the telephone set, said second frame means have a stopper means which abuts said body when said slide member is moved in said given direction to said second position, thereby to block further movement of said slide member in said given direction.

8. A telephone apparatus comprising:
a base unit having a first electrical connector;
a handset removably mounted on the base unit;
a transmitter/receiver; and
an adaptor, said base unit being removably mounted to said adaptor, said adaptor including
a second electrical connector removably coupled to said first connector, and
means for protectively covering said second connector when said base unit is removed from said adaptor.

9. A telephone apparatus comprising:
a base unit having a first electrical connector;
a handset removably mounted on the base unit;
a transmitter/receiver;
an adaptor, said base unit being removably mounted to said adaptor, said adaptor including
a body,
a second electrical connector on said body, said second connector being removably coupled to said first connector, said second connector being electrically connected to said transmitter/receiver, and
a slide member including a housing, said slide member being mounted on said body for sliding movement between a first position in which, with said base unit mounted on said adaptor, said body and said slide member jointly support said base unit and said second connector is connected to said first connector, and a second position in which, with said base unit removed from said adaptor; said housing covers said second connector.

10. An telephone apparatus according to claim 9, wherein said slide member has an opening shaped to expose said second connector therethrough when said slide member is in said first position, said housing receiving said second connector when said slide member moves to said a second position.

11. A telephone apparatus according to claim 10, wherein said first connector is a female connector, and said second connector is a male connector which projects into said opening when said slide member is in said first position and when said slide member is between said first position and said second position, and which projects into said cover housing when said slide member is in said second position.

12. An adaptor according to claim 1, further comprising lock means for releasably locking said slide member in at least one of said first and second positions, said lock means including
an elastic hook means formed on said slide member; and
at least one catch means, in said body, for releasably catching said hook means when said slide member is in said at least one of said first and second positions.

* * * * *